3,282,976
α,α-BIS(SUBSTITUTED SULFONYLTHIO)-XYLENES

Joseph E. Dunbar, Midland, Mich., assignor to The Dow Chemical Company, Midland, Mich., a corporation of Delaware
No Drawing. Filed Oct. 28, 1963, Ser. No. 319,525
7 Claims. (Cl. 260—453)

The present invention is directed to α,α'-bis-(substituted sulfonylthio)xylenes having the formula

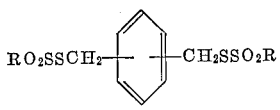

In this and succeeding formulae, R represents lower alkyl, phenyl, lower alkyl phenyl, halophenyl, lower alkylhalophenyl, lower alkoxyphenyl or benzyl. In the present specification and claims, the expressions "lower alkyl" and "lower alkoxy" are employed to designate radicals containing up to and including 6 carbon atoms. These compounds are crystalline solid materials which are somewhat soluble in many common organic solvents and of low solubility in water. The compounds are useful as pesticides and are adapted to be employed for the control of a number of insects, bacterial and fungal organisms such as roaches, potato and tomato late blight, *Aspergillus terreus*, *Pullularia pullulans* and *Rhizopus nigricans*.

The novel α,α'-bis(substituted sulfonylthio)xylenes of the present invention are prepared by reacting an α,α'-dihaloxylene having the formula

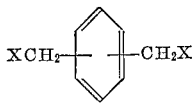

where X represents halogen, with an alkali metal salt of a thiosulfonic acid corresponding to the formula:

$$\text{Alkali metal—S—SO}_2\text{—R}$$

The reaction conveniently is carried out in an organic liquid as reaction medium such as dimethylformamide, dimethyl sulfone, dimethyl sulfoxide, ethanol, methanol, n-propanol, nitromethane, acetone, sulfolane, isopropanol, aqueous acetone, aqueous methanol and aqueous ethanol. The amounts of the reagents to be employed and reaction conditions are not critical, some of the desired product being obtained at once when employing any proportion of the reactants. In a preferred method of operation, good results are obtained when employing one molecular proportion of the α,α'-dihaloxylene with about two molecular proportions of the alkali metal salt of the thiosulfonic acid, such as the sodium or potassium salt. Representative materials to be employed are the α,α'-dihaloxylenes, wherein halo designates chloro, bromo or iodo, sodium 3,5-dichloro-6-trimethylbenzenethiosulfonate, potassium, 3,5-diethylbenzenethiosulfonate, sodium 3-methyl-5-chlorobenzenethiosulfonate, sodium 4-butoxybenzenethiosulfonate, potassium hexanethiosulfonate, sodium 2,4,5-trichlorobenzenethiosulfonate, sodium 2,6-dimethyl-4-chlorobenzenethiosulfonate, and sodium 3-ethyl-5-iodobenzenethiosulfonate. The reaction takes place smoothly at temperatures at which alkali metal halide of reaction is produced. The reaction is usually carried out at temperatures between 0° and 150° C. and preferably at the temperature range between 25° and 120° C.

In carrying out the reaction, the reactants are mixed and contacted together in any convenient fashion, preferably in the presence of the organic reaction medium and the resulting mixture maintained for a short period in the reaction temperature range to insure completion of the reaction. The length of time that the reactants are to be maintained at the reaction temperature is determined, in part, by the reaction temperature; a greater length of time being required for the reaction to go to completion at the lower temperature.

Following the reaction, the reaction mixture is processed by conventional procedures to obtain the desired product. In one such convenient procedure the reaction mixture is filtered while still hot to remove the halide of reaction. The filtrate is then allowed to cool to room temperature whereupon the desired product crystallizes from the solution. The crystalline product is separated and recrystallized by any convenient method. In another convenient procedure, the filtered reaction mixture is diluted with ice water. During the dilution procedure, the desired product separates in the mixture as a crystalline solid or as an organic oil. This solid or oil product is collected by decantation, or filtration. The product in this form may be employed in pesticidal applications, or further purified by conventional procedures such as washing and recrystallization from common organic solvents.

The following examples merely illustrate the invention and are not to be construed as limiting.

EXAMPLE 1

α,α'-Bis(butylsulfonylthio)-p-xylene

α,α'-Dichloro-p-xylene (17.5 grams; 0.100 mole) and potassium butanethiosulfonate (38.5 grams; 0.200 mole) were dispersed in 250 milliliters of ethanol. The resulting mixture was then boiled with stirring under reflux for 17.5 hours. After the heating period, the reaction mixture was filtered, while still hot, to remove the potassium chloride by-product. The filtrate was then allowed to cool to room temperature. During the cooling the α,α'-bis(butylsulfonylthio)-p-xylene product precipitated as a crystalline solid. This crystalline solid was separated from the reaction mixture by filtration and twice recrystallized from ethanol. The colorless recrystallized product melted at 79°–81° C. and had carbon, hydrogen and sulfur contents of 47.00, 6.52 and 31.65 percent, respectively, as compared with theoretical contents of 46.80, 6.38 and 31.23 percent.

EXAMPLE 2

α,α'-Bis(p-tolylsulfonylthio)-p-xylene $$CH_3-\langle\ \rangle-O_2SSCH_2-\langle\ \rangle-CH_2SSO_2-\langle\ \rangle-CH_3$$

Into 100 milliliters of ethanol were dispersed 9.6 grams (0.042 mole) of potassium p-toluenethiosulfonate and 3.7 grams (0.021 mole) of α,α'-dichloro-p-xylene. The resulting mixture was boiled with stirring under reflux for 16.5 hours. The α,α'-bis(p-tolylsulfonylthio)-p-xylene product which precipitated during the heating period was then removed by filtration and successively washed with water to remove the potassium chloride by-product. The washed product was dissolved in a minimum amount of boiling isopropanol and the hot solution decolorized with activated charcoal, filtered and cooled to room temperature. As a result of these operations, there was obtained the α,α'-bis(p-tolylsulfonylthio)-p-xylene product which melted at 150°–152° C. The recrystallized product had carbon, hydrogen and sulfur contents of 55.20, 4.77 and 26.91 percent, respectively, as compared to theoretical contents of 55.20, 4.63 and 26.79 percent.

EXAMPLE 3

α,α'-Bis(4-bromophenylsulfonylthio)-p-xylene

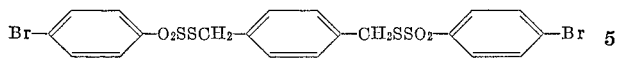

α,α'-Dichloro-p-xylene (2.9 grams; 0.016 mole) and potassium p-bromobenzenethiosulfonate (9.5 grams; 0.033 mole) were dispersed in 100 milliliters of ethanol. The resulting mixture was boiled with stirring under reflux for 16.5 hours. During the heating period, the α,α'-bis(4-bromophenylsulfonylthio)-p-xylene product precipitated together with the potassium chloride by-product. This precipitate was collected by filtration and successively washed with water to remove the potassium chloride. The solid product remaining after the washing procedure was dried and recrystallized from nitromethane. The colorless recrystallized product melted at 169°–171° C. and had carbon, hydrogen and sulfur contents of 39.41, 2.82 and 21.00 percent, respectively, as compared with the theoretical contents of 39.48, 2.65 and 21.08 percent.

EXAMPLE 4

α,α'-Bis(methylsulfonylthio)-m-xylene

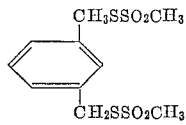

Potassium methanethiosulfonate (28.6 grams; 0.190 mole) and α,α'-dibromo-m-xylene (25.0 grams; 0.0948 mole) were dispersed in 50 milliliters of dimethylformamide. The resulting mixture was heated for one and one quarter hours at a temperature of 95° C. Following the heating period, the reaction mixture was filtered while hot and the filtrate was poured into 700 milliliters of ice water. The α,α'-bis(methylsulfonylthio)-m-xylene product precipitated as a crystalline mass, which was collected by filtration and recrystallized from methanol. The colorless recrystallized product melted at 71°–72.5° C. and had carbon, hydrogen and sulfur contents of 37.02, 4.38 and 39.21 percent, respectively, as compared to the theoretical contents of 36.79, 4.32 and 39.28 percent.

EXAMPLE 5

α,α'-Bis(ethylsulfonylthio)-o-xylene

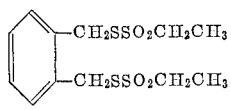

α,α'-Dibromo-o-xylene (25.0 grams; 0.0947 mole) and potassium ethanethiosulfonate (31.1 grams; 0.189 mole) were dispersed in 50 milliliters of dimethylformamide. The resulting mixture was heated at 95° C. for one hour and then filtered while hot to remove the potassium bromide which formed during the reaction period. The filtrate was then diluted with 600 milliliters of ice water. During the dilution procedure, the diluted mixture separated into an aqueous layer and an organic layer. The organic layer was extracted with methylene chloride, and the methylene chloride extract dried over anhydrous magnesium sulfate. The solvent was removed from the extract by evaporation to obtain the α,α'-bis(ethylsulfonylthio)-o-xylene product as an oily residue. The residue was allowed to stand for two days during which time it solidified to form a crystalline mass which was recrystallized from isopropanol. The colorless recrystallized product melted at 63.5°–66.5° C. and had carbon, hydrogen and sulfur contents of 40.47, 5.05 and 36.13 percent, respectively, as compared to the theoretical contents of 40.65, 5.12 and 36.17 percent.

EXAMPLE 6

α,α'-Bis(4-methoxyphenylsulfonylthio)-o-xylene

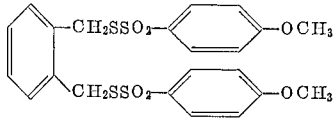

In 350 milliliters of ethanol were dispersed, 24.2 grams (0.100 mole) of potassium 4-methoxybenzenethiosulfonate and 13.2 grams (0.0500 mole) of α,α'-dibromo-o-xylene. The resulting mixture was boiled with stirring under reflux for 45 minutes to complete the reaction. The reaction was then filtered, the filtrate diluted with a small amount of warm ethanol and the diluted mixture cooled to room temperature. During the cooling, the α,α'-bis(4-methoxyphenylsulfonyl)-o-xylene precipitated as a crystalline solid which was recrystallized from isopropanol. The colorless recrystallized product melted at 91.5°–93.5° C. and had carbon, hydrogen and sulfur contents of 51.82, 4.37 and 25.06 percent, respectively, as compared to the theoretical contents of 51.74, 4.34 and 25.11 percent.

EXAMPLE 7

α,α'-Bis(phenylmethylsulfonylthio)-o-xylene

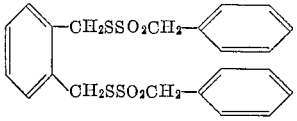

Potassium phenylmethanethiosulfonate (18.1 grams; 0.0800 mole) and α,α'-dibromo-o-xylene (10.6 grams; 0.0400 mole) were dispersed in 250 milliliters of ethanol and the resulting mixture boiled with stirring under reflux for 3 hours. The reaction mixture was then processed in the same manner as described in Example 1 to obtain the α,α' - bis(phenylmethylsulfonylthio) - o - xylene product as a crystalline solid. The colorless recrystallized product melted at 114°–116° C. and had carbon, hydrogen and sulfur contents of 55.40, 4.55 and 26.56 percent, respectively, as compared to the theoretical contents of 55.40, 4.63 and 26.79 percent.

In a similar manner, the following novel compounds of the present invention are prepared:

α,α' - Bis(4 - hexoxyphenylsulfonylthio) - m - xylene (molecular weight of 670) by reacting together α,α'-dichloro-m-xylene and sodium 4-hexoxybenzenethiosulfonate.

α,α' - Bis(3,4,5 - tribromophenylsulfonylthio) - o - xylene (molecular weight of 943) by reacting together α,α'-dibromo-o-xylene and potassium 3,4,5-tribromobenzenethiosulfonate.

α,α' - (Bis(2,4,6 - trichlorophenylsulfonylthio) - p - xylene (molecular weight of 676) by reacting together α,α' - diiodo - p - xylene and potassium 2,4,6 - trichlorobenzenethiosulfonate.

α,α' - Bis(phenylsulfonylthio) - p - xylene (melting at 121.5°–123° C. and having carbon, hydrogen and sulfur contents of 53.28, 3.94 and 28.36 percent, respectively, as compared to the theoretical contents of 53.31, 4.03 and 28.46 percent) by reacting together α,α'-dichloro-p-xylene and potassium benzenethiosulfonate.

α,α' - Bis(4 - hexylphenylsulfonylthio) - p - xylene (molecular weight of 638) by reacting together α,α'-dichloro-p-xylene and sodium 4-hexylbenzenethiosulfonate.

α,α' - Bis(2 - iodo - 4 - ethylphenylsulfonylthio) - m - xylene (molecular weight of 778) by reacting together α,α'-dibromo-m-xylene and sodium 2-iodo-4-ethylbenzenethiosulfonate.

α,α' - Bis(pentamethylphenylsulfonylthio) - p - xylene (molecular weight of 610) by reacting together α,α'-diiodo-p-xylene and sodium pentamethylbenzenethiosulfonate.

α,α' - Bis(2,5 - dichlorophenylsulfonylthio) - o - xylene (molecular weight of 785) by reacting together α,α'-dichloro - o - xylene and potassium 2,5 - dichlorobenzenethiosulfonate.

α,α' - Bis(2,5 - dimethylphenylsulfonylthio) - p - xylene (melting at 138°–140° C. and having carbon, hydrogen and sulfur contents of 57.00, 5.16 and 25.33 percent, respectively, as compared with the theoretical contents of 56.89, 5.17 and 25.31 percent) by reacting together α,α'-dichloro-p-xylene and potassium 2,5-dimethylbenzenethiosulfonate.

α,α' - Bis(3 - pentylsulfonylthio) - m - xylene (molecular weight of 610) by reacting together α,α'-dichloro-m-xylene and potassium pentanethiosulfonate.

α,α' - Bis(3,5 - dimethyl - 4 - bromophenylsulfonylthio)-o-xylene (molecular weight of 684) by reacting together α,α'-dichloro-o-xylene and potassium 3,5-dimethyl-4-bromobenzenethiosulfonate.

α,α' - Bis(pentachlorophenylsulfonylthio) - m - xylene (molecular weight of 814) by reacting together α,α'-dibromo-m-xylene and potassium pentachlorobenzenethiosulfonate.

α,α' - Bis(methylsulfonylthio) - o - xylene (recrystallized product melting at 80.5°–81° C. and having carbon, hydrogen and sulfur contents of 36.99, 4.31 and 39.33 percent, respectively, as compared to the theoretical contents of 36.79, 4.32 and 39.28 percent) by reacting together α,α'-dibromo-o-xylene and potassium methanethiosulfonate.

α,α' - Bis(p - tolylphenylthio) - o - xylene (melting at 94°–96° C. and having carbon, hydrogen and sulfur contents of 55.33, 4.60 and 27.13 percent, respectively, as compared to the theoretical contents of 55.20, 4.63 and 26.79 percent) by reacting together α,α'-dibromo-o-xylene and potassium p-toluenethiosulfonate.

The compounds of the present invention or compositions containing the same can be applied to pests and their habitats and food in parasiticidal amounts to obtain excellent controls and kills of many organisms. Also, the compounds can be employed as slimicides in the white water in paper mills or the water employed in cooling towers. Additionally, the compounds can be included in inks, adhesives, soaps, cutting oils, high energy fuels or oil or latex paints to prevent mold and mildew, and the degradation of such products resulting from microbial attack. Further, the compounds can be employed as the toxic constituents in compositions for the control of blight and fungal diseases of various plants.

The compounds conveniently can be employed in liquid or dust formulations. In such usage, the compounds are modified with one or a plurality of adjuvants or helpers including water, organic solvents, petroleum oils, petroleum distillates or other liquid carriers, surface active dispersing agents and finely divided solids such as chalk, talc or bentonite. Depending upon the concentration of the parasiticide compounds in such formulations, the augmented compositions are adapted to be distributed on plants or plant parts, or in soil, inks, adhesives, cutting oils, high energy fuels, paints, white or cooling water, or to be employed as concentrates and subsequently diluted with additional liquid or solid adjuvants to produce the ultimate treating compositions.

The exact concentration of the bis(substituted sulfonylthio)xylenes to be employed in the treating compositions is not critical and may vary considerably provided the required amount of effective agent is supplied on the plant or plant parts or in the soil, ink, adhesive, cutting oil, high energy fuel, textile, paper, wood and so forth. The concentration of toxicant in liquid compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

In representative operations, aqueous compositions containing 300 parts per million by weight of one of α,α'-bis(methylsulfonylthio)-o-xylene and α,α'-bis(methylsulfonylthio)-m-xylene give excellent controls of tomato and potato late blight, Phytophthora infestans. In other operations, aqueous compositions containing 500 parts per million of α,α'-bis(methylsulfonylthio)-o-xylene give excellent controls and kills of Aspergillus terreus, Pullularia pullulans and Rhizopus nigricans. In further operations, good controls and kills of Staphylococcus aureus are obtained with α,α' - bis(4 - methoxyphenylsulfonylthio)-o-xylene at concentrations of 1 percent by weight.

The thiosulfonates employed as starting materials in accordance with the teachings of the present invention can be prepared in accordance with known methods. In one method, potassium hydrosulfide (KSH) is reacted with a suitable lower alkane, benzene, lower alkylbenzene, halobenzene, alkylhalobenzene, lower methoxybenzene or phenylmethane sulfonyl halide. Representative halides include the chlorides and bromides such as pentanesulfonyl chloride, 2,3-dimethylbutanesulfonyl chloride, 5-propoxybenzenesulfonyl bromide, 3-propoxybenzenesulfonyl bromide, 2-chloro-5-hexylbenzenesulfonyl bromide, 3-bromo-5-hexylphenylmethanesulfonyl chloride and 4-ethoxyphenylmethanesulfonyl bromide. In a convenient procedure, the reaction is carried out by adding the sulfonyl halide to an aqueous or alcoholic solution or potassium hydroxide saturated with $H_2S$. Upon completion of the reaction, the desired starting materials are separated by conventional procedures.

The dihaloxylenes used as starting materials in the present invention are obtained by known procedures. The dichloro (-o-, -m-, -p-) xylenes are obtained by treating the desired xylene with chlorine or in the alternative, by treating the desired xylene with $PCl_5$ at 190° C. The dibromoxylenes are obtained by treating the proper xylene with bromine. The diiodoxylenes can be prepared from the corresponding dichloroxylene by means of a halogen exchange using a metal iodide.

I claim:

1. A compound corresponding to the formula

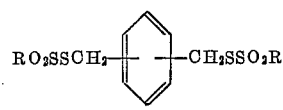

wherein R represents lower alkyl, phenyl, lower alkylphenyl, halophenyl, lower alkylhalophenyl, lower alkoxyphenyl and benzyl, in which halo represents a member of the group consisting of chloro, bromo and iodo.

2. α,α'-Bis(butylsulfonylthio)-p-xylene.
3. α,α'-Bis(methylsulfonylthio)-m-xylene.
4. α,α'-Bis(methylsulfonylthio)-o-xylene.
5. α,α'-Bis(ethylsulfonylthio)-o-xylene.
6. α,α'-Bis(p-tolylsulfonylthio)-o-xylene.
7. α,α'-Bis(4-methoxyphenylsulfonylthio)-o-xylene.

References Cited by the Examiner

UNITED STATES PATENTS 3,047,393   7/1962   Herz et al. _____ 260—453

CHARLES B. PARKER, Primary Examiner.

DALE R. MAHANAND, D. M. PAPUGA,
*Assistant Examiners.*